(12) United States Patent
Kurukchi et al.

(10) Patent No.: US 11,279,890 B1
(45) Date of Patent: Mar. 22, 2022

(54) CHEMISORPTION OF CARBONYLS FROM LIQUID PHASE HYDROCARBONS USING SOLID SODIUM BISULFITE

(71) Applicant: Janus Technology Solutions, LLC, Spring, TX (US)

(72) Inventors: Sabah A. Kurukchi, Houston, TX (US); Joseph M. Gondolfe, Magnolia, TX (US)

(73) Assignee: Janus Technology Solutions, LLC, Spring, TX (US)

( * ) Notice: Subject to any disclaimer, the term of this patent is extended or adjusted under 35 U.S.C. 154(b) by 0 days.

(21) Appl. No.: 17/507,993

(22) Filed: Oct. 22, 2021

Related U.S. Application Data

(60) Provisional application No. 63/105,714, filed on Oct. 26, 2020.

(51) Int. Cl.
*C10G 61/06* (2006.01)
*B01D 53/04* (2006.01)
*B01J 8/24* (2006.01)
*B01D 3/14* (2006.01)

(52) U.S. Cl.
CPC ............. *C10G 61/06* (2013.01); *B01D 3/143* (2013.01); *B01D 53/04* (2013.01); *B01J 8/24* (2013.01); *B01D 2253/112* (2013.01); *B01D 2256/24* (2013.01); *B01D 2257/708* (2013.01); *C10G 2300/202* (2013.01); *C10G 2300/207* (2013.01); *C10G 2300/308* (2013.01); *C10G 2300/4018* (2013.01); *C10G 2400/20* (2013.01)

(58) Field of Classification Search
None
See application file for complete search history.

(56) References Cited

U.S. PATENT DOCUMENTS

2017/0137349 A1* 5/2017 Kurukchi ................. C10G 3/00

* cited by examiner

*Primary Examiner* — Philip Y Louie
(74) *Attorney, Agent, or Firm* — C. Tumey Law Group PLLC

(57) ABSTRACT

Disclosed are methods and systems for removing reactive carbonyl monomers which can polymerize to produce red oil. In an embodiment the method may include cracking a hydrocarbon stream in a fluidized catalytic cracker to produce a cracked hydrocarbon stream comprising carbonyl compounds; separating hydrocarbon components from the cracked hydrocarbon stream in a debutanizer column to form a debutanizer overhead LPG stream comprising the carbonyl compounds; introducing the debutanizer LPG overhead stream into a carbonyl removal unit comprising a metal bisulfite bed; reacting the carbonyl compounds in the debutanizer overhead LPG stream to form a carbonyl adduct with the metal bisulfite; and withdrawing a first LPG product stream from the carbonyl removal unit.

20 Claims, 5 Drawing Sheets

CHEMISORPTION OF CARBONYLS FROM LIQUID PHASE HYDROCARBONS USING SOLID SODIUM BISULFITE

BACKGROUND

Light olefins such as ethylene and propylene are important raw materials in the petrochemical industry because they are building blocks for many end products such as polyethylene and polypropylene. Propylene is produced primarily by steam cracking and fluidized catalytic cracking (FCC) of naphthas and gas oils. Steam cracking accounts for about 60-65% of the world's propylene production, FCC accounts for about 30%, and the remainder is typically produced on-purpose propylene technologies such as metathesis chemistry and/or propane dehydrogenation.

Ethylene and gasoline are the primary products from steam cracking and FCC, respectively, while propylene and other light olefins may be obtained as byproducts from these processes. Propylene may also be produced by cracking heavy liquid hydrocarbons whereas cracking ethane typically produces almost no propylene. Most modern steam crackers use ethane feedstock, as recently ethane feedstock became more abundant from shale gas, leading to less propylene being produced via steam cracking plants.

On-purpose propylene production technologies, such as propane dehydrogenation and metathesis, may be used to bridge the propylene demand gap. However, the cost associated with these technologies remains less competitive relative to steam crackers and FCC. There are several emerging FCC catalysts involving the addition of modified ZSM-5 catalysts and as well as technologies such as DCC (Deep Catalytic Cracking), CPP (Catalytic Pyrolysis Process), high severity FCC cracking (e.g. Indmax® and Petro-FCC®) which may be used in the FCC process to produce more olefins at the expense of gasoline production. However, the effluent from the FCC process configured for propylene production may contain contaminants which may foul downstream equipment. Reactive oxygenates such as carbonyls may be generated in the FCC process which may polymerize downstream of the FCC unit to form what is known as "red oil" which may foul equipment.

BRIEF DESCRIPTION OF THE DRAWINGS

These drawings illustrate certain aspects of some of the embodiments of the present invention and should not be used to limit or define the invention.

DETAILED DESCRIPTION

Figure 1:
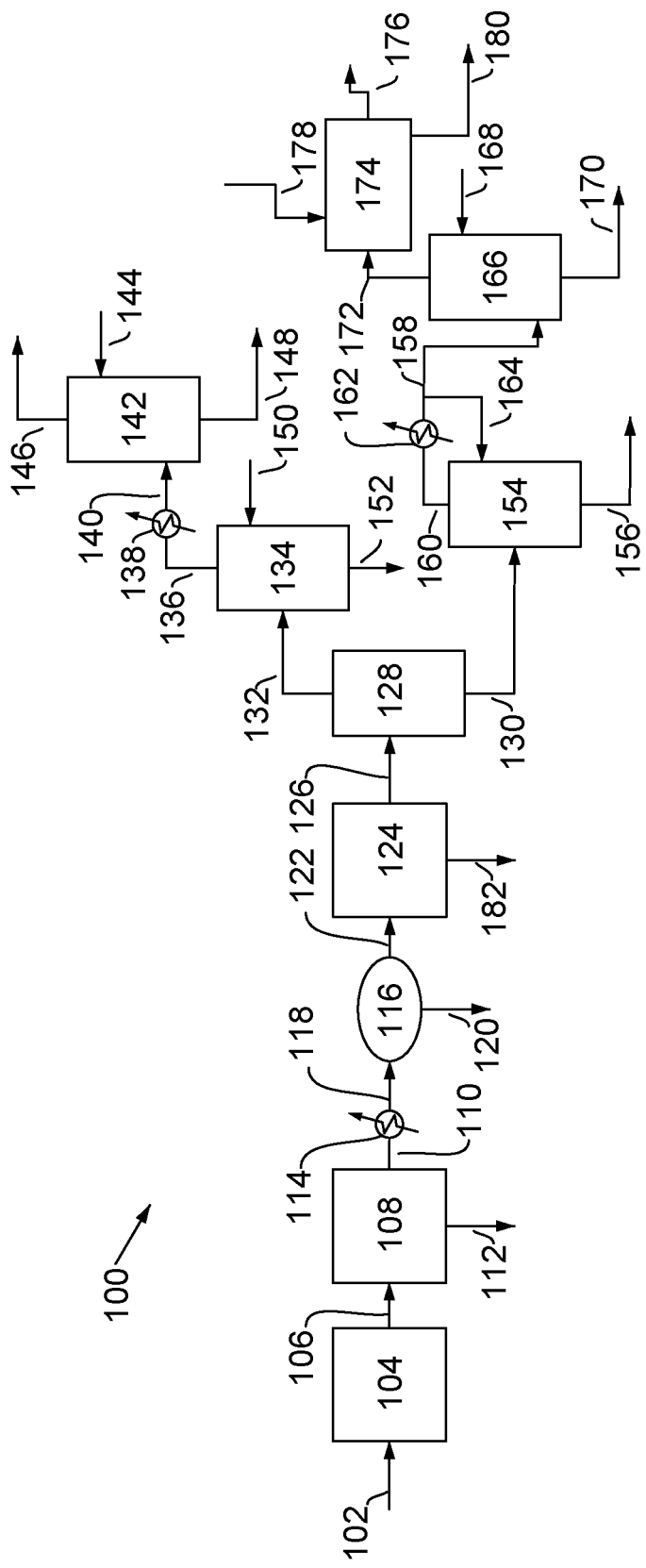
FIG. 1 illustrates a schematic diagram of an FCC unit.

As discussed above, there may be challenges to propylene production in FCC units. FCC reactors which operate to produce propylene may also have an increase in the proportion of polymerizable carbonyl contaminants in the FCC reactor effluent. Concentrations of carbonyls such as acetaldehyde and acetone may be found in FCC reactor effluent streams at about 10 ppm in conventional FCC reactors to greater than 2000 ppm carbonyls in DCC and CPP reactors, depending on reactor operating conditions and feed. Carbonyl species generated in FCC reactors that are not removed may polymerize to produce red oils in downstream units thereby fouling units and equipment downstream from the FCC reactor. The present disclosure is directed to systems and methods for removing carbonyl species from FCC reactor effluent streams thereby reducing red oil fouling downstream of the FCC reactor.

In FCC units compounds such as acids, alcohols, ammonia, hydrogen cyanide, and carbonyl compounds containing carbonyl groups may be produced as side products. Some side products may be relatively soluble in water and may contaminate aqueous condensate streams downstream of the FCC unit. For example, a condensate stream may be produced in a compressor downstream from the FCC unit which may include aqueous soluble side products from the FCC unit. The compressor condensate stream is usually processed on site at wastewater treatment to remediate the contaminants. Further side products may be removed by caustic contact, catalyzed caustic contact, and amine contact. The carbonyl compounds produced in the FCC unit follow the C3 products such as propylene and propane as well as C4 products such as butanes, isobutene, and butylenes in the fractionation train.

Amine extractors may be used to remove acid gasses such as hydrogen sulfide from FCC reactor effluent by contacting the reactor effluent with an amine solution. Carbonyl compounds such as aldehydes are absorbed into the amine solution and become trapped in the amine extractor. The carbonyl compounds dissolved in the alkaline amine solutions react to produce polyaldols by aldol condensation reaction(s). The reaction of aldehyde monomers followed by further polymerization leads to the formation of a high molecular weight red/yellow solid to liquid polymer known in the industry as "red oil." which may deposit on the internals of the amine extractor. The red oil polymer fouls the surfaces of the amine extractor which may eventually plug the amine extractor. Fouling and plugging of the internal equipment of the amine extractor leads to unit downtime during cleaning and lost production. Additionally, the red oil polymer formed in the amine absorber will be carried to the amine regenerator which operates at much higher temperature, for example about 110-115° C. The elevated temperature in the amine regenerator accelerates the aldol condensation reactions causing further polymerization and fouling in the amine regenerator.

FCC reactor effluent may also be contaminated with mercaptans (RSH) which may be removed by contacting the reactor effluent with an aqueous caustic solution in a mercaptan extractor unit. In the mercaptan extractor, a hydrocarbon stream is contacted with caustic solution in a caustic section of the mercaptan extractor to react the mercaptan species (RSH) present in the LPG product stream to form a corresponding mercaptide (e.g. RSNa). The reaction may be carried out at any suitable temperature, including, but not limited to temperatures between about 30° C. to about 40° C. The mercaptan extracted LPG product is withdrawn from the caustic section and the rich caustic containing the mercaptide is introduced into an oxidation section. The rich caustic may be mixed with a cobalt-based catalyst such as a cobalt-phthalocyanine catalyst and air and to react the mercaptides to disulfide oil (DSO). The reaction may be carried out at any suitable temperature, including, but not limited to temperatures between about 55° C. to about 60°

C. In some embodiments, the oxidation section may include a packed bed to promote mixing of the aqueous caustic and the water-insoluble disulfide oil. The aqueous caustic and disulfide oil may be separated in a separator section whereby a lean caustic and disulfide oil may be withdrawn. The disulfide oil may be routed to fuel storage or to a hydrotreater unit. The regenerated lean caustic is then pumped back to the top of the extraction section for reuse.

Carbonyls in the hydrocarbon which enter the caustic extractor are transferred from the hydrocarbon phase into the aqueous caustic phase and react with the caustic solution producing polymers by aldol condensation reaction(s) to produce red oil as discussed above. The rich caustic leaving the caustic section includes a portion of dissolved components and reaction products including mercaptide, aldol polymer, and dissolved hydrocarbon components. In some embodiments, the hydrocarbon phase may also contain butadiene which has large solubility in the aqueous phase. This rich caustic solution now with added cobalt ions, saturated with oxygen and heated to elevated temperature (e.g., 55-60° C.) provides enhanced conditions for aldol polymerization of the dissolved carbonyls and the addition polymerization of the dissolved butadiene monomer.

FIG. 1 is an embodiment of an FCC unit 100. The FCC embodiment illustrated in FIG. 1 includes an amine absorber for the removal of acid gases from the FCC off Gas and an amine extractor to remove H2S from produced LPG. While FIG. 1 illustrates one embodiment of an FCC unit, this disclosure may be utilized in any FCC process. In the illustrated embodiment, FCC feedstock 102 may be introduced into FCC reactor 104 where the hydrocarbon components of FCC feedstock 102 may be catalytically cracked to from reactor effluent 106 which may include hydrogen, light hydrocarbons such as methane, ethylene, ethane, propylene, propane, C4 olefin/saturate, naphthas, middle and heavy distillates, as well as acid gases, and minor amounts of carbonyls and nitriles. FCC feedstock 102 may include any suitable FCC feed, including but not limited to, naphthas and gas oils, for example.

From FCC reactor 104, reactor effluent 106 may be introduced into main fractionator 108 whereby the components of reactor effluent 106 may be separated. Main fractionator 108 may include a multi-section column with pump arounds and a means for withdrawing a naphtha, light cycle oil (LCO) and heavy cycle oil (HCO) products. Main fractionator 108 may include an overhead vapor stream 110 which may comprise gasoline range and lighter hydrocarbons as well as steam and inert gases. For example, the overhead vapor may comprise about, expressed in mole percent, 25-33% H2O, 1-2% N2, 0.2-0.3% CO2, 0.01-0.02% H2S, 4-8% Cl, 4-7% ethylene, 1-4% ethane, 10-19% propylene, 4-8% propane, 7-15% C4's, 3-5% C5's and balance C6+. The main fractionator bottoms product 112 may comprise relatively heavier hydrocarbons, such as HCO and slurry oil which may recycled back to the reactor for further cracking. One side product from main fractionator 108 is LCO of true boiling point (TBP) cut of 140-370° C. and is largely mono/di/tri/poly aromatics.

Overhead vapor stream 110 may be withdrawn from main fractionator 108 and may be at least partially condensed in main fractionator condenser 114. A portion of the steam and hydrocarbons may be condensed in and passed to accumulator 116 as stream 118 where sour condensate stream 120 comprising water with dissolved species such as acids, alcohols, and ammonia, may be separated and gas stream 122 may be withdrawn. In some embodiments, gas stream 122 from accumulator 116 may comprise about, expressed in mole percent, 5-6.4% H2O, 1.8-2.2% N2, 0.4-0.5% CO2, 0.015-0.02% H2S, 9-10.6% Cl, 14-15% C2's, 28-30% C3's, 15-20% C4's, 5-6% C5's and the balance C6+. Gas stream 122 from accumulator 116 may be introduced into compressor 124. Compressor 124 may include a multistage compressor with interstage cooling unit. A condensate stream 182 may be separated that may include water with additional dissolved species which may include carbonyls, nitriles, hydrogen sulfide, and other water-soluble species.

In the illustrated embodiment, gas stream 126 may continue from compressor 124 to separator 128. Separator 128 may recover C3 components and heavier hydrocarbons from gas stream 126 to form bottom stream 130 and recover C2 and lighter components and a portion of C3 components from gas stream 126 to form overhead stream 132. Separator 128 may include any suitable separator such as an absorber/stripper column, for example. Overhead stream 132 may be introduced into sponge absorber 134 which may recover a portion of the C3+ from overhead stream 132 using absorption oil stream 150. In some embodiments, a lean oil product from main fractionator 108 may be used as an absorption oil in sponge absorber 134. Rich stream 152 containing absorbed species may be withdrawn as a bottoms stream from sponge absorber 134. Sponge absorber overhead 136 may be cooled in off gas cooler 138 and cooled stream 140 may be fed into the amine absorber 142. Lean amine stream 144 may be introduced into and contacted with cooled stream 140 whereby CO2 and H2S present in cooled stream 140 may be absorbed into the lean amine. Refinery off gas stream 146 may be withdrawn as an overhead stream from amine absorber 142 and rich amine stream 148 may be withdrawn as a bottoms stream. Refinery off gas stream 146 may include, expressed in mole percent, about 5-6% N2, 16-20% H2, 28-32% CH4, 27-31% ethylene 8-12% ethane, and balance C3+. Lean amine stream 144 may include any suitable amine including, but not limited to, methyldiethanolamine (MDEA) about 30 to 45 wt % in water.

Bottom stream 130 may be introduced into debutanizer 154 where the C5+ and heavier hydrocarbons may be separated to form a C5+ liquid gasoline product which may be withdrawn as stream 156 and an LPG (liquefied petroleum gas) product which may be withdrawn as LPG stream 158. LPG stream 158 may comprise about, expressed in mole percent, 50-54% propylene, 8-12% propane, 0.15-0.5% 1,3-Butadiene, 14-16% butanes, and 15-25% butenes with 10-20 ppm H2S, 100-200 ppm mercaptans, 200-300 ppm acetaldehyde and 200-300 ppm acetone by weight. Debutanizer 154 may include any suitable separation equipment including but not limited to distillation columns. Overhead stream 160 from debutanizer 154 may be introduced into total condenser 162 where the overhead stream 160 may condense. A portion of the condensed stream may be returned t as reflux stream 164. LPG stream 158 may be introduced into amine extractor 166 where LPG stream 158 may be contacted with lean amine stream 168 to remove H2S, for example to less than 0.1 mppm. In some embodiments, lean amine stream 168 may comprise a solution of 30-45% MDEA in water. A rich amine stream 170 may exit a bottoms section of amine extractor 166 containing absorbed species. LPG stream 172 may be further introduced to a mercaptan extractor unit 174 for mercaptan removal to produce treated LPG 176. In some embodiments, the mercaptan extractor unit 174 may be a Merichem™ or MEROX® Extractor Unit, with regenerated caustic stream 178 comprising 18-20% by weight caustic feed to the extractor, and mercaptide loaded caustic solution stream 180 leave the extractor for oxidation and regeneration.

Figure 2:
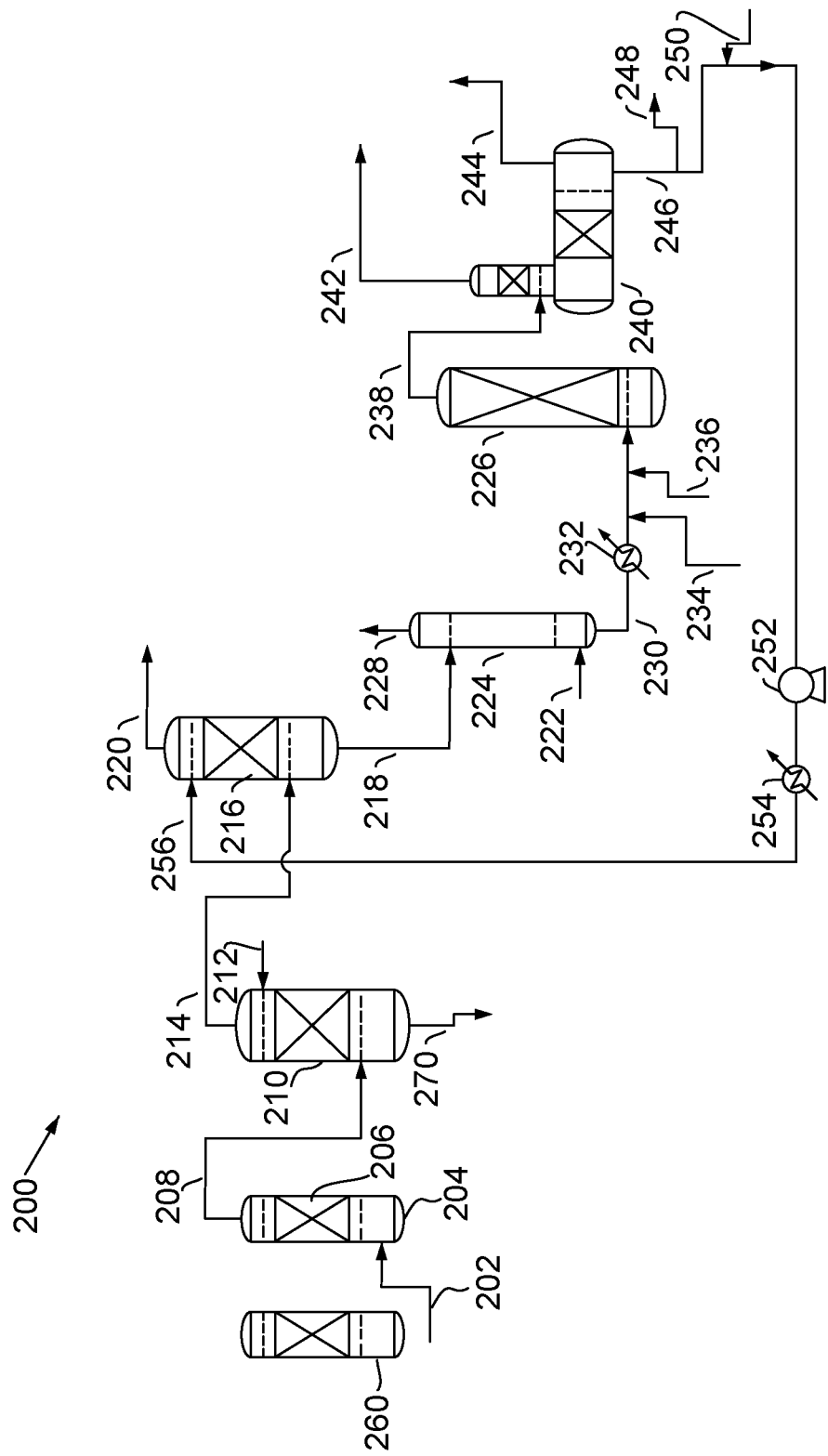
FIG. 2 is a schematic illustration of a system for carbonyl treatment of an FCC derived hydrocarbon steam upstream of the LPG amine extractor.
Figure 4:
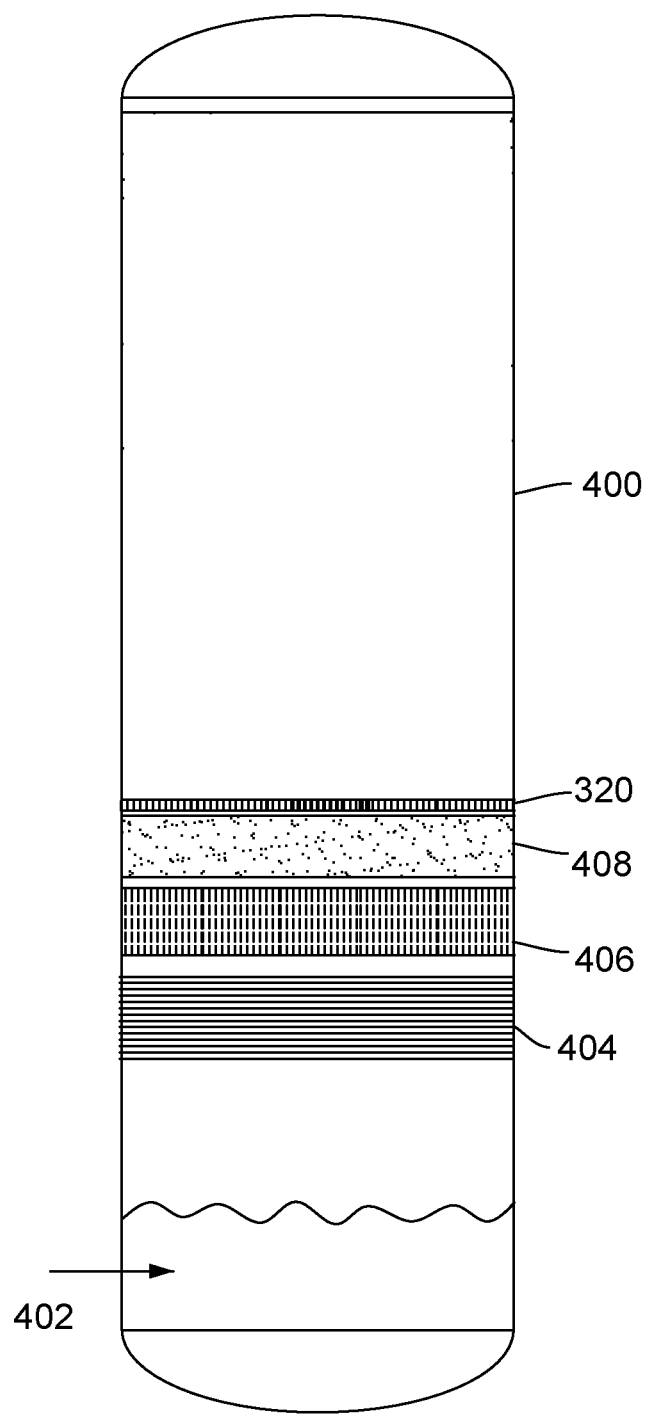
FIG. 4 illustrates an embodiment of an adsorption column.

FIG. 2 is a schematic illustration of a system 200 for carbonyl treatment of an FCC derived hydrocarbon steam. As discussed above, FCC derived hydrocarbon streams may be contaminated with one or more of carbonyls, H2S, and mercaptan (RSH) compounds. In some embodiments, liquid hydrocarbon stream 202 can be introduced into a mass transfer device such as carbonyl removal unit 204 whereby carbonyls may be reacted with a metal bisulfite. Liquid hydrocarbon stream 202 can include the carbonyl contaminated LPG stream 158 as illustrated in FIG. 1. Carbonyl removal unit 204 can include a vessel and an adsorbent bed 206 comprising a metal bisulfite. In some embodiments, carbonyl removal unit 204 may be an adsorption column comprising a pressure vessel with an internal bottom liquid distribution zone, followed by a bed support grid, followed by a bed support packing, and a screen, wherein the bed of metal bisulfite is disposed between the bed support packing and the screen. FIG. 4 is an embodiment of an adsorption column 400 including internal bottom liquid distribution zone 402, followed by a bed support grid 404, followed by a bed support packing 406, metal bisulfite bed 408, and screen 410.

In carbonyl removal unit 204, carbonyls from liquid hydrocarbon stream 202 may be contacted with the metal bisulfite in adsorbent bed 206 thereby reacting the carbonyls with the metal bisulfite to produce a carbonyl adduct with the metal bisulfite. The formation of the carbonyl adduct with the metal bisulfite removes the carbonyl from the liquid hydrocarbon thereby reducing or wholly preventing red oil formation in downstream equipment. Overhead stream 208 may include all of the components of liquid hydrocarbon stream 202 which were not reacted in adsorbent bed 206 and may be essentially free of carbonyls, for example below 1 ppm. In some embodiments, overhead stream 208 may be essentially free of the acetaldehyde, for example less than 1 ppm, and have greater than 95% of the acetone removed, if present, as compared to liquid hydrocarbon stream 202. In the example where liquid hydrocarbon stream 202 is LPG stream 158 it may include, in mole percent, about 50-54% propylene, 8-12% propane, 0.15-0.5% 1,3-Butadiene, 14-16% butanes, and 15-25% butenes by weight. While only one adsorbent bed is illustrated in FIG. 2, carbonyl removal unit 204 may include a plurality of beds as needed for removing carbonyls.

Adsorbent bed 206 may include any solid crystalline metal bisulfite that is capable of forming an adduct with carbonyls. For example, the metal bisulfite may include an alkali metal bisulfite such as, without limitation, sodium bisulfite, potassium bisulfite, magnesium bisulfite, strontium bisulfite, or combinations thereof. The adduct formed between the metal bisulfite and carbonyls may gradually convert the metal bisulfite in adsorbent bed 206 to the solid adduct product and reducing the amount of metal bisulfite available to react with incoming carbonyls. The metal bisulfite in adsorbent bed 206 may be regenerated to increase the bed activity by breaking the adduct and leaving regenerated metal bisulfite ready to further react with carbonyls. Regenerating the metal bisulfite may include passing hot air, hot nitrogen, or steam through absorbent bed 206 thereby forming a carbonyl gas which is carried out of adsorbent bed 206 with the hot gas or steam. The hot air, hot nitrogen, or steam may be at any suitable temperature, such as from about 80° C. to about 110° C. In some embodiments, a second carbonyl removal unit 260 may be provided as a standby unit for when carbonyl removal unit 204 is in regeneration. Second carbonyl removal unit 260 may be identical to carbonyl removal unit 204 and may include an adsorbent bed which includes the metal bisulfite. Second carbonyl removal unit 260 may be brought online while carbon removal unit 204 is in regen thereby reducing downtime.

Overhead stream 208 may be introduced into amine extractor 210 for further treatment to remove H2S and other acid gas species. Lean amine 212 may be introduced into amine extractor 210 and may be contacted counter-currently with overhead stream 208 to remove H2S content. Lean amine 212 may include any suitable amine, including, but not limited to about 30-45% MDEA. Rich amine 270 may exit from the bottom of the amine extractor 210 for regeneration of the amine.

Treated stream 214 from amine extractor 210, may be essentially free of H2S (e.g., less than 0.1 ppm) and may contain trace acetone (e.g., less than 10 ppm) and butadiene concentration (e.g., less than 0.15 mole %). Treated stream 214 may be introduced to mercaptan extractor 216 for removal of remaining mercaptans (RSH). Mercaptan extractor 216 may include any suitable mercaptan removal methods including, but not limited to, caustic extraction by contact with circulating NaOH solution. Lean caustic solution 256 may be introduced into mercaptan extractor 216 and react with mercaptans in treated stream 214 to form mercaptides (e.g. RSNa). Lean caustic solution 256 may include an aqueous caustic solution such as about 18-20 wt. % NaOH in water at temperature of about 30-40° C. Rich caustic solution 218 containing the formed mercaptide salted may be withdrawn from mercaptan extractor 216. LPG product 220 may be essentially free of mercaptans, for example, less than about 1.0 ppm mercaptans and may be essentially free of carbonyls, for example less than about 2 ppm as a result of treating with metal bisulfite in adsorbent bed 206. LPG product 220 may be used as a feed to other separation process, for example a C3 portion or a C4 portion may be recovered in a distillation column.

Figure 3:
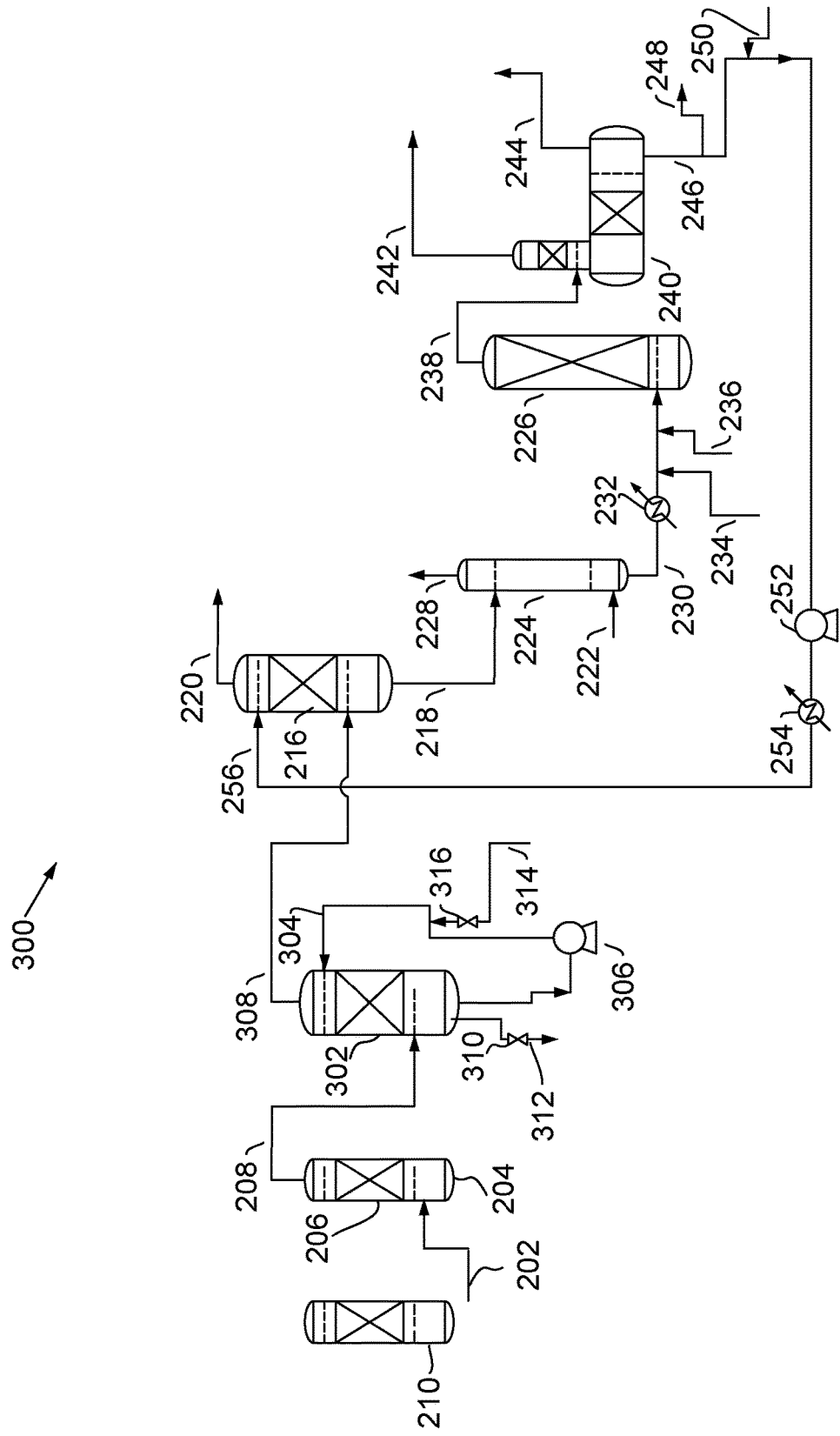
FIG. 3 is a schematic illustration of a system for carbonyl treatment of an FCC derived hydrocarbon steam upstream of the LPG caustic extractor.

As illustrated within FIG. 3, rich caustic solution 218 from the mercaptan extractor 216 may be stripped of its trace butadiene and residual acetone content by stripping with fuel gas stream 222 or nitrogen in butadiene stripper 224, generally operated at a temperature of 40° C. or less, for example. Removal of the polymer precursor (butadiene and acetone) may be advantageous to prevent fouling of the downstream caustic oxidizer 226 which may be operated at a higher temperature of 50-55° C. Stripped gasses 228 containing butadiene and acetone may exit at the top of butadiene stripper 224. Rich caustic solution 230 from the bottom of butadiene stripper 224 may cross oxidizer heater 232 and may be mixed with process air 234 and makeup catalyst 236. Makeup catalyst may include any suitable oxidation catalyst such as cobalt-based catalysts, for example. Rich caustic solution 230, process air 234, and makeup catalyst 236 may be introduced into caustic oxidizer 226. In some embodiments, caustic oxidizer 226 may be loaded with charcoal rings packing to promote the homogeneous distribution of the three phases. The mercaptides such as RSNa present in the rich caustic solution may be oxidized to disulfides RSSR with the aid of Co based catalyst dispersed into the caustic solution. The resulting oxidizer top effluent 238 may include generated disulfide, air, and caustic solution which may be introduced into disulfide separator 240. Disulfide separator 240 may include any suitable equipment such phase separation equipment separating the phases of oxidizer top effluent 238. In some embodiments, excess air 242, disulfide oil (RSSR) 244, and regenerated caustic solution 246 containing caustic solution with dissolved catalyst may be withdrawn from disulfide separator 240. A portion of regenerated caustic solution 246 may be withdrawn as purged caustic stream 248 which may limit disulfide content in the recirculating caustic. Additionally, makeup caustic stream 250 may replenish the caustic solution in the recirculation loop. Pump 252 may pump caustic solution through the lean caustic water cooler 254 and to mercaptan extractor 216 as lean caustic solution 256.

FIG. 3 is a schematic illustration of a system 300 for treatment of a liquid phase hydrocarbon stream for removal of carbonyls. System 300 differs from system 200 on FIG. 2 in that a caustic extractor 302 is used in place of the amine extractor 210. In the illustrated embodiment, a liquid hydrocarbon stream may be contaminated with one or more of carbonyls, H2S, and mercaptans (RSH). In some embodiments, liquid hydrocarbon stream 202 can be introduced into a mass transfer device such as carbonyl removal unit 204 whereby carbonyls may be reacted with a metal bisulfite. Liquid hydrocarbon stream 202 can include any carbonyl contaminated stream such as LPG stream 158, gas stream 125, or stream 130 on FIG. 1, for example. Carbonyl removal unit 204 can include a vessel and an adsorbent bed 206 comprising a metal bisulfite as described with respect to FIG. 2.

Overhead stream 208 from carbonyl removal unit 204 may be introduced into caustic extractor 302 where overhead stream 208 may be contacted with lean caustic 304. Lean caustic 304 may include an aqueous caustic solution such as about 1-10 wt. % NaOH in water. The caustic solution may react with H2S in overhead stream 208 forming an aqueous soluble Na2S product thereby removing H2S from overhead stream 208. Rich caustic may be withdrawn from caustic extractor 302 and pumped using pump 306 back to caustic extractor 302 for counter current contact with overhead stream 208. Caustic solution may be refreshed by opening purge valve 310 to withdraw caustic purge stream 312 and adding caustic fresh caustic 314 to be added through addition valve 316. Treated hydrocarbon stream 308 leaving the caustic extractor 302 may be essentially free of the H2S, for example below 1 ppm. Treated hydrocarbon stream 308 may be introduced into mercaptan extractor 216 as described above with reference to FIG. 2.

Accordingly, the preceding description describes utilization of a method to remove carbonyls from FCC product streams using metal bisulfites. The apparatus, systems, and methods disclosed herein may include any of the various features disclosed herein, including one or more of the following embodiments.

Statement 1. A method comprising: cracking a hydrocarbon stream in a fluidized catalytic cracker to produce a cracked hydrocarbon stream comprising carbonyl compounds; separating hydrocarbon components from the cracked hydrocarbon stream in a debutanizer column to form a debutanizer overhead LPG stream comprising the carbonyl compounds; introducing the debutanizer LPG overhead stream into a carbonyl removal unit comprising a metal bisulfite bed; reacting the carbonyl compounds in the debutanizer overhead LPG stream to form a carbonyl adduct with the metal bisulfite bed; and withdrawing a first LPG product stream from the carbonyl removal unit.

Statement 2. The method of statement 1 wherein the metal bisulfite bed comprises an alkali metal bisulfite.

Statement 3. The method of statement 1 wherein the metal bisulfite bed comprises a metal bisulfite is selected from the group consisting of sodium bisulfite, potassium bisulfite, magnesium bisulfite, strontium bisulfite, and combinations thereof.

Statement 4. The method of statement 1 wherein the metal bisulfite bed comprises sodium bisulfate.

Statement 5. The method of statement 1 wherein the carbonyl removal unit comprises a pressure vessel comprising an internal bottom liquid distribution zone, followed by a bed support grid, followed by a bed support packing, followed by a screen, wherein the metal bisulfite bed is disposed between the bed support packing and the screen.

Statement 6. The method of statement 1 wherein the first LPG product stream comprises less than about 1 ppm carbonyl compounds.

Statement 7. The method of statement 1 wherein the first LPG product stream comprises C3 and/or C4 hydrocarbons and about 2 ppm or less carbonyl compounds.

Statement 8. The method of statement 1 wherein the carbonyl compounds comprise acetaldehyde and/or acetone and wherein the first LPG product stream comprises about 2 ppm or less acetaldehyde and/or acetone.

Statement 9. The method of statement 1 further comprising introducing the first LPG product stream into an amine extractor or a caustic extractor, wherein the first LPG product stream further comprises hydrogen sulfide, and wherein the method further comprises removing at least a portion of the hydrogen sulfide from the first LPG product stream in the amine extractor or the caustic extractor to produce a second LPG product stream.

Statement 10. The method of statement 9 further comprising introducing the second LPG product stream into a mercaptan extractor, wherein the second LPG product stream further comprises mercaptan compounds, and wherein the method further comprises removing at least a portion of the mercaptan compounds from the second LPG product stream in the mercaptan extractor to produce a third LPG product stream.

Statement 11. The method of statement 10 further comprising introducing the third LPG product stream into a C3 distillation train and separating a chemical grade propylene stream and/or a polymer grade propylene stream from the third LPG product stream.

Statement 12. The method of statement 11 wherein the chemical grade propylene stream comprises greater than about 92 wt. % propylene and the polymer grade propylene stream comprises greater than about 99.5 wt. % propylene.

Statement 13. The method of statement 9 further comprising introducing the third LPG product stream into a C4 distillation train and separating a butene stream from the third LPG product stream.

Statement 14. The method of statement 1, further comprising: introducing a gas into the carbonyl removal unit; heating the carbonyl adduct with the gas; dissociating the carbonyl adduct to form a carbonyl gas and regenerated metal bisulfite; and purging the carbonyl gas from the carbonyl removal unit.

Statement 15. A system comprising: an FCC unit comprising an FCC reactor configured to crack a hydrocarbon feed stream to produce a cracked hydrocarbon stream, wherein the cracked hydrocarbon stream comprises carbonyl compounds; a debutanizer column fluidically coupled to the cracked hydrocarbon stream, wherein the debutanizer column is configured to separate a debutanizer overhead stream comprising the carbonyl compounds; and a carbonyl removal unit fluidically coupled to the debutanizer overhead stream, wherein the carbonyl removal unit comprises a metal bisulfite bed, and wherein the carbonyl removal unit is configured to contact the debutanizer overhead stream with the metal bisulfite bed and produce an LPG product stream.

Statement 16. The system of statement 15 wherein the carbonyl removal unit comprises: a pressure vessel; an internal bottom liquid distribution zone in the pressure vessel; a bed support grid positioned above the internal bottom liquid distribution zone; a bed support packing positioned above the bed support grid; the metal bisulfite bed positioned above the bed support packing; and a screen positioned above the metal bisulfite bed.

Statement 17. The system of statement 15 wherein the metal bisulfite bed comprises a metal bisulfite is selected from the group consisting of sodium bisulfite, potassium bisulfite, magnesium bisulfite, strontium bisulfite, and combinations thereof.

Statement 18. The system of statement 15 further comprising an amine extractor and/or a caustic extractor fluidically coupled to the LPG product stream.

Statement 19. The system of statement 18 further comprising a mercaptan extractor fluidically coupled to an outlet of the amine extractor and/or an outlet of the caustic extractor.

Statement 20. The system of statement 19 further comprising a C3 distillation train or a C4 distillation train coupled to an outlet of the mercaptan extractor.

EXAMPLES

To facilitate a better understanding of the present embodiments, the following illustrative examples of some of the embodiments are given. In no way should such examples be read to limit, or to define, the scope of the disclosure.

The removal of carbonyls from a liquid phase hydrocarbon stream in the example embodiments may be further illustrated by the following examples wherein all percentages are by weight unless specified otherwise. A gas chromatography (GC) method was used to evaluate the composition of acetaldehyde and acetone in the hydrocarbon stream. Liquid samples were collected by filling sample bottles from the adsorbed bed column overhead outlet. Each sample was then analyzed by gas chromatography (GC) to determine the amount of acetaldehyde and acetone in the hydrocarbon liquid.

The adsorber bed Column consisted of 7.6 cm inside diameter stainless steel column, packed with solid sodium bisulfite crystals to a height of 61.0 cm. Controlled flow rate of liquid n-butane with 310 ppm acetone was allowed to flow up the solid sodium sulfite bed in the adsorber. The adsorber was operated at 100-110 psig (6.9-7.6 barg) and temperature of 113° F. (45° C.). Temperatures below 50° C. are well suited for the reaction of sodium bisulfite with acetaldehyde and acetone to form solid adduct on the solid sodium bisulfite crystals adsorbent.

The adsorber was regenerate at 10 psig (0.69 barg) and temperature of 212° F. (100° C.). Temperatures between 100° C. and 110° C. are well suited for the decomposition of the adduct to sodium bisulfite and gaseous acetaldehyde and acetone which are carried with the regeneration gas out of the bed.

Iso-octane with varying amounts of acetone was contacted and agitated with solid sodium bisulfite crystals for 24 hour period at room temperature the acetone content in the hydrocarbon iso-octane was measured in the initial solution and after adsorption and in experiments where appreciable concentration of acetone remained in iso-octane solution in equilibrium with adsorbent solid sodium bisulfite.

Example 1

The adsorption bed column was operated with liquid n-butane containing 310 wppm acetone which was fed to the bottom of the adsorption column at a flow rate corresponding to a space velocity of 0.3 LHSV and contacted the solid sodium bisulfite bed. The acetone reacted completely with the sodium bisulfite and formed an adduct in the bed. Thus, the acetone was depleted from the n-butane hydrocarbon phase and at the adsorber column top outlet the n-butane stream the concentration measured less than 2 wppm acetone which was the limit of accuracy of analytics. Data for Example 1 is shown in Table 1.

TABLE 1

Adsorption of Acetone on Sodium Bisulfite for Example-1

| RUN-1 | Unit | Value |
| --- | --- | --- |
| Column ID | cm | 7.6 |
| Bed Height | cm | 61 |
| Column CSA | cm2 | 45.6 |
| Bed Volume | cm3 | 2780 |
| Bed Weight | gms | 3197 |
| n-Butane Density | gm/cm3 | 0.52 |
| Bulk Solid SBS Density | gm/cm3 | 1.15 |
| n-Butane Flow Rate | cm3/min | 14.1 |
| Feed Concentration of Acetone in n-butane | wPPm | 310 |
| Outlet Concentration of Acetone in n-butane | wPPm | <2* |
| LHSV | cm3/cm3 | 0.32 |

*Denotes measurement limitation of analytical equipment

Example 2

The adsorption bed column was operated under similar conditions as in Example-1, except that the flow rate of liquid n-butane to the adsorption column was increase from 14.1 cm3/min to 33.7 cm3/min and hence the corresponding liquid hourly space velocity in the bed increased from 0.3 LHSV to 0.73 LHSV. The acetone was depleted from the n-butane hydrocarbon phase and at the adsorber column top outlet the n-butane stream the concentration measured less than 2 wppm acetone which was the limit of accuracy of analytics. Data for Example 2 is shown in Table 2.

TABLE 2

Adsorption of Acetone on Sodium Bisulfite for Example-2

| RUN-2 | Unit | Value |
| --- | --- | --- |
| Column ID | cm | 7.6 |
| Bed Height | cm | 61 |
| Column CSA | $cm^2$ | 45.6 |
| Bed Volume | $cm^3$ | 2780 |
| Bed Weight | gms | 3197 |
| n-Butane Density | $gm/cm^3$ | 0.52 |
| Bulk Solid SBS Density | $gm/cm^3$ | 1.15 |
| n-Butane Flow Rate | $cm^3/min$ | 33.7 |
| Feed Concentration of Acetone in n-butane | wppm | 310 |
| Outlet Concentration of Acetone in n-butane | wppm | <2* |
| LHSV | cm3/cm3 | 0.73 |

Example 3

Figure 5:
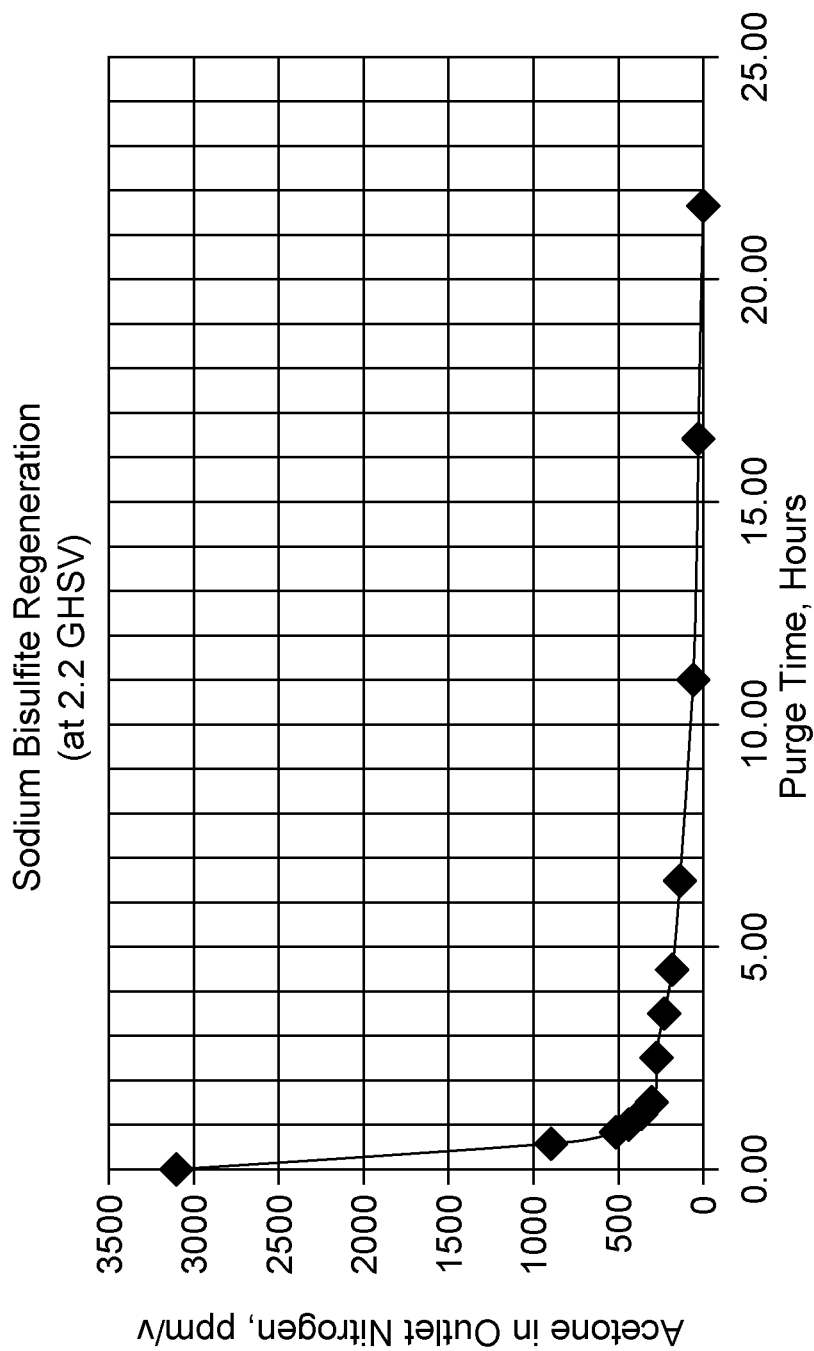
FIG. 5 is a graph of acetone concentration versus time for a test reactor.

The sodium bisulfite adsorption bed gets saturated with the adduct and the bed is switched for regeneration; hot nitrogen gas at temperature of 100° C. and pressure of 10 psig. The flow rate of nitrogen is controlled to be 480-488 cc/min corresponding to an average bed space velocity of 2.1 GHSV Data for Example 3 is shown in table 3. The results of Example 3 are further shown in graph form in FIG. 5.

TABLE 3

| Run 3 REGENERATION OF SBS | | |
|---|---|---|
| Regeneration Gas | | Nitrogen |
| Bed Volume | cm3 | 2708 |
| Bed Weight | gms | 3197 |
| Bed L/D: | | 8 |
| Density n-C4 | gm/cm3 | 0.52 |
| Density of SBS | gm/cm3 | 1.15 |
| inlet N2 Pressure | psig | 10 |
| N2 Flow Rate | cm3/min | 5844 |
| GHSV | cm3/cm3 | 2.2 |

| Run time hours | Outlet Acetone Conc, ppm | Notes |
|---|---|---|
| 0.00 | | |
| 0.00 | 3100 | Start |
| 0.75 | 955 | |
| 1.00 | 530 | |
| 1.25 | 450 | |
| 1.50 | 400 | |
| 2.00 | 310 | |
| 2.50 | 247 | |
| 3.00 | | |
| 3.50 | 181 | |
| 4.00 | | |
| 4.50 | 135 | |
| 5.50 | | |
| 6.50 | 79 | |
| 8.50 | | |
| 11.00 | 52 | |
| 15.25 | | |
| 16.50 | 24 | |
| 20.68 | 10 | Shutdown |

Example 4

Iso-octane with varying amounts of acetone was contacted and agitated with solid sodium bisulfite crystals for a 24-hour period at room temperature. The acetone content in the hydrocarbon iso-octane was measured in the initial solution and after adsorption and in experiments where appreciable concentration of acetone remained in iso-octane solution in equilibrium with adsorbent solid sodium bisulfite. The data showed the acetone loading capacity at room temperature is 14 lb acetone per 100 lb of SBS. Data for Example 4 is shown in Table 5.

TABLE 5

| Acetone Loading Capacity on SBS RUN 4 CARBONYL LOADING CAPACITY | | | |
|---|---|---|---|
| Feed Acetone Conc. wppm | Residual Acetone Conc. wppm | % Acetone Removal | Calculated wt. % SBS Capacity |
| 10026 | 3055 | 69.5 | 14.0 |
| 19689 | 12715 | 35.4 | 13.9 |

Mixed C3's stream from steam cracker or FCC unit are normally distilled to produce chemical grade propylene (CGP), or polymer grade propylene (PGP) these C3 products have tight specification on carbonyl content of <2 ppm; therefore it is imperative to remove the carbonyls in the mixed C3's stream upstream of the Propylene Distillations Column using Solid Sodium Bisulfite (SBS) Adsorber.

Hydrocarbon feed streams to petroleum refining catalytic processes particularly C4's streams often contain oxygenated carbonyl organic compounds which can cause catalyst deactivation and other process unit performance problems. Solid SBS is an excellent adsorbent for the removal of aldehydes and ketones from the liquid hydrocarbon feed streams to isomerization and alkylation processes.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is 'to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The foregoing figures and discussion are not intended to include all features of the present techniques to accommodate a buyer or seller, or to describe the system, nor is such figures and discussion limiting but exemplary and in the spirit of the present techniques.

What is claimed is:

1. A method for removing carbonyls comprising:
cracking a hydrocarbon stream in a fluidized catalytic cracker to produce at least a cracked hydrocarbon stream comprising carbonyl compounds;
separating hydrocarbon components from the cracked hydrocarbon stream in a debutanizer column to form at least a debutanizer overhead LPG stream comprising the carbonyl compounds;
introducing the debutanizer overhead LPG stream into a carbonyl removal unit comprising an adsorbent bed comprising a solid metal bisulfite;
reacting at least a portion of the carbonyl compounds in the debutanizer overhead LPG stream with the adsorbent bed to form at least a carbonyl adduct; and
withdrawing at least a first LPG product stream from the carbonyl removal unit.

2. The method of claim 1 wherein the metal bisulfite comprises an alkali metal bisulfite.

3. The method of claim 1 wherein the metal bisulfite comprises a metal bisulfite selected from the group consisting of sodium bisulfite, potassium bisulfite, magnesium bisulfite, strontium bisulfite, and combinations thereof.

4. The method of claim 1 wherein the metal bisulfite comprises sodium bisulfite.

5. The method of claim 1 wherein the carbonyl removal unit comprises a pressure vessel comprising an internal bottom liquid distribution zone, followed by a bed support grid, followed by a bed support packing, followed by a screen, wherein the metal bisulfite bed is disposed between the bed support packing and the screen.

6. The method of claim 1 wherein the first LPG product stream comprises contaminant carbonyl compounds in an amount of about 1 ppm or less.

7. The method of claim 1 wherein the first LPG product stream comprises C3 and/or C4 hydrocarbons and wherein the first LPG product stream comprises contaminant carbonyl compounds in an amount of about 2 ppm or less.

8. The method of claim 1 wherein the carbonyl compounds comprise acetaldehyde and/or acetone and wherein the first LPG product stream comprises about 2 ppm or less acetaldehyde and/or acetone.

9. The method of claim 1 further comprising introducing the first LPG product stream into an amine extractor or a caustic extractor, wherein the first LPG product stream further comprises hydrogen sulfide, and wherein the method further comprises removing at least a portion of the hydrogen sulfide from the first LPG product stream in the amine extractor or the caustic extractor to produce a second LPG product stream.

10. The method of claim 9 further comprising introducing the second LPG product stream into a mercaptan extractor, wherein the second LPG product stream further comprises mercaptan compounds, and wherein the method further comprises removing at least a portion of the mercaptan compounds from the second LPG product stream in the mercaptan extractor to produce a third LPG product stream.

11. The method of claim 10 further comprising introducing the third LPG product stream into a C3 distillation train and separating a chemical grade propylene stream and/or a polymer grade propylene stream from the third LPG product stream.

12. The method of claim 11 wherein the chemical grade propylene stream comprises propylene in an amount of 92 wt. % or more and the polymer grade propylene stream comprises propylene in an amount of about 99.5 wt. % or more.

13. The method of claim 9 further comprising introducing the third LPG product stream into a C4 distillation train and separating a butene stream from the third LPG product stream.

14. The method of claim 1, further comprising:
introducing a gas into the carbonyl removal unit;
heating the carbonyl adduct with the gas;
dissociating the carbonyl adduct to form a carbonyl gas and regenerated metal bisulfite; and
purging the carbonyl gas from the carbonyl removal unit.

15. A system for removing carbonyls comprising:
an FCC unit comprising an FCC reactor configured to crack a hydrocarbon feed stream to produce at least a cracked hydrocarbon stream, wherein the cracked hydrocarbon stream comprises carbonyl compounds;
a debutanizer downstream from the FCC reactor, wherein the debutanizer is configured to separate a debutanizer overhead stream comprising the carbonyl compounds from at least a portion of the cracked hydrocarbon stream; and
a carbonyl removal unit fluidically coupled to the debutanizer, wherein the carbonyl removal unit comprises an adsorbent bed comprising a solid metal bisulfite, and wherein the carbonyl removal unit is configured to contact the debutanizer overhead stream with the adsorbent bed and produce at least an LPG product stream.

16. The system of claim 15 wherein the carbonyl removal unit comprises:
a pressure vessel;
an internal bottom liquid distribution zone in the pressure vessel;
a bed support grid positioned above the internal bottom liquid distribution zone;
a bed support packing positioned above the bed support grid;
the metal bisulfite bed positioned above the bed support packing; and
a screen positioned above the metal bisulfite bed.

17. The system of claim 15 wherein the metal bisulfite comprises a metal bisulfite selected from the group consisting of sodium bisulfite, potassium bisulfite, magnesium bisulfite, strontium bisulfite, and combinations thereof.

18. The system of claim 15 further comprising an amine extractor and/or a caustic extractor fluidically coupled to the carbonyl removal unit.

19. The system of claim 18 further comprising a mercaptan extractor fluidically coupled to an outlet of the amine extractor and/or an outlet of the caustic extractor.

20. The system of claim 19 further comprising a C3 distillation train or a C4 distillation train coupled to an outlet of the mercaptan extractor.

* * * * *